United States Patent
Moon et al.

(10) Patent No.: US 12,419,480 B2
(45) Date of Patent: Sep. 23, 2025

(54) ROBOT DEVICE AND CONTROL METHOD THEREFOR

(71) Applicant: SAMSUNG ELECTRONICS CO., LTD., Suwon-si (KR)

(72) Inventors: Kyungjin Moon, Suwon-si (KR); Boseok Moon, Suwon-si (KR); Sanghyun Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 450 days.

(21) Appl. No.: 17/941,829

(22) Filed: Sep. 9, 2022

(65) Prior Publication Data

US 2023/0000304 A1      Jan. 5, 2023

Related U.S. Application Data

(63) Continuation of application No. PCT/KR2021/003212, filed on Mar. 16, 2021.

(30) Foreign Application Priority Data

Apr. 20, 2020   (KR) .................. 10-2020-0047672

(51) Int. Cl.
*A47L 11/40*        (2006.01)
*G05D 1/00*        (2024.01)

(52) U.S. Cl.
CPC ........ *A47L 11/4011* (2013.01); *G05D 1/0238* (2013.01); *G05D 1/0246* (2013.01); *G05D 1/0274* (2013.01); *A47L 2201/04* (2013.01)

(58) Field of Classification Search
CPC ............. A47L 11/4011; A47L 2201/04; G05D 1/0238; G05D 1/0246; G05D 1/0274;
(Continued)

(56) References Cited

U.S. PATENT DOCUMENTS

| | | | |
|---|---|---|---|
| 9,063,535 B2 | 6/2015 | Yanagita et al. |
| 9,928,459 B2 | 3/2018 | Kim et al. |
| 10,417,844 B2 | 9/2019 | Ambrose et al. |
| 10,723,018 B2 | 7/2020 | Griffin et al. |
| 10,983,525 B2 | 4/2021 | Lee et al. |
| 2007/0208442 A1 | 9/2007 | Perrone |

(Continued)

FOREIGN PATENT DOCUMENTS

| | | |
|---|---|---|
| EP | 1 936 463 A2 | 9/2008 |
| JP | 5505652 B2 | 5/2014 |

(Continued)

OTHER PUBLICATIONS

Communication dated Jul. 27, 2023 issued by the European Patent Office in European Application No. 21792813.4.

(Continued)

*Primary Examiner* — Ryan Rink
(74) *Attorney, Agent, or Firm* — Sughrue Mion, PLLC

(57) ABSTRACT

A robot device includes: a sensor configured to generate sensing data related to an action of the robot device; a communication interface configured to communicate with a server; a memory storing instructions; and a processor configured to execute the instructions to: based on the action of the robot device changing, store action data in the memory, the action data including instruction data corresponding to the action, the sensing data related to the action, and map data related to the action, transmit, to the server via the communication interface, the action data stored in the memory, receive, from the server via the communication interface, threshold data corresponding to the action, and based on identifying that the sensing data is outside of a threshold range based on the threshold data received from the server, generate an event.

20 Claims, 11 Drawing Sheets

(58) Field of Classification Search
CPC .... G05D 1/225; G05D 1/857; G05D 2101/15; G05D 2105/10; G05D 2105/315; G05D 2107/40; G05D 2109/10; G06F 2201/81; G06F 11/0736; G06F 11/0754; G06F 11/3636; G06F 11/366; B25J 9/161; B25J 9/1661; B25J 9/1679; B25J 9/1694
See application file for complete search history.

(56) References Cited

U.S. PATENT DOCUMENTS

| | | | |
|---|---|---|---|
| 2018/0231981 A1 | 8/2018 | Storfer et al. | |
| 2018/0364711 A1 | 12/2018 | Goldfain et al. | |
| 2019/0171217 A1 | 6/2019 | Lee et al. | |
| 2019/0271976 A1 | 9/2019 | Namikoshi | |
| 2019/0333359 A1 | 10/2019 | Moroniti et al. | |
| 2020/0034661 A1 | 1/2020 | Kim et al. | |
| 2020/0211223 A1* | 7/2020 | Van De Sluis | G06T 7/75 |
| 2021/0232149 A1* | 7/2021 | Griffin | G06V 20/10 |

FOREIGN PATENT DOCUMENTS

| | | | |
|---|---|---|---|
| JP | 6510761 | B2 | 5/2019 |
| JP | 2019-166592 | A | 10/2019 |
| JP | 2020-502636 | A | 1/2020 |
| JP | 2020-32259 | A | 3/2020 |
| KR | 10-0767120 | B1 | 10/2007 |
| KR | 10-2010-0125794 | A | 12/2010 |
| KR | 10-2012-0116606 | A | 10/2012 |
| KR | 10-1263487 | B1 | 5/2013 |
| KR | 10-2019-0065830 | A | 6/2019 |
| KR | 10-2019-0106861 | A | 9/2019 |
| WO | 2016/125111 | A1 | 8/2016 |

OTHER PUBLICATIONS

Examination Report issued on Mar. 20, 2024 by the European Patent Office for European Patent Application No. 21792813.4.
International Search Report (PCT/ISA/210) issued Jun. 8, 2021 by the International Searching Authority in International Application No. PCT/KR2021/003212.
Written Opinion (PCT/ISA/237) issued Jun. 8, 2021 by the International Searching Authority in International Application No. PCT/KR2021/003212.
Communication dated Mar. 9, 2025 issued by the Korean Intellectual Property Office in Korean Patent Application No. 10-2020-0047672.

* cited by examiner

ROBOT DEVICE AND CONTROL METHOD THEREFOR

CROSS-REFERENCE TO RELATED APPLICATIONS

This application is a continuation application of International Application No. PCT/KR2021/003212 filed on Mar. 16, 2021, which is based on and claims priority to Korean Patent Application 10-2020-0047672, filed on Apr. 20, 2020, in the Korean Intellectual Property Office, the disclosures of which are incorporated by reference herein in their entireties.

BACKGROUND

1. Field

The disclosure relates to a robot device and a control method therefor, and more particularly, to a robot device that moves, and a control method therefor.

2. Description of Related Art

Electronic devices of various types are being developed and distributed, and in particular, along with active research going on in the field of robots, the distribution rate of household robots of various types other than industrial robots is on the increase.

When developing a robot device, in a logging method based on texts, there may be a problem in that the amount of logs may increase exponentially according to the operation time, as there may be a great variety of components included in the robot device, and each component may create and add entries to their respective logs.

As a result, replay of the operation history of a related robot device may not be straightforward using a log file generated according to a logging method based on texts. Alternatively or additionally, the log file may be inappropriate for searching for logging information regarding a problem that occurred between operations.

Furthermore, a log file generated according to a related logging method may be unsuitable for a developing environment for a related robot device, such as, but not limited to, requiring a separate compiling process to be performed.

Accordingly, there exists a need for further improvements in logging methods. In particular, a logging method that allows for replay of the operation history in a straightforward and fast manner without requiring a separate compiling process. Improvements are presented herein. These improvements may also be applicable to other technologies that employ these logging methods.

SUMMARY

Provided are a robot device that generates and stores data according to the operation of the robot device, and replays the operation based on the data, and a control method therefor.

According to an aspect of the disclosure, a robot device includes: a sensor configured to generate sensing data related to an action of the robot device; a communication interface configured to communicate with a server; a memory storing instructions; and a processor configured to execute the instructions to: based on the action of the robot device changing, store action data in the memory, the action data including instruction data corresponding to the action, the sensing data related to the action, and map data related to the action, transmit, to the server via the communication interface, the action data stored in the memory, receive, from the server via the communication interface, threshold data corresponding to the action, and based on identifying that the sensing data is outside of a threshold range based on the threshold data received from the server, generate an event.

The instruction data may be in a robot programming language format, and may be configured to control at least one of a driving distance, a driving direction, or a driving speed of the robot device, and the processor may be further configured to execute the instructions to control the robot device, according to the instruction data, to generate the action.

The sensing data related to the action includes operation data generated in hardware elements of the robot device during performance of the action by the robot device, the map data may include information on an object located in a specific place that the robot device is located, and the information on the object may include at least one of location information of the object, size information of the object, shape information of the object, or characteristic information of the object.

The threshold data may include threshold range values of sensing data for each action of the robot device, the threshold range values having been acquired according to an analysis of the action data transmitted to the server, and the processor may be further configured to execute the instructions to identify whether the sensing data related to the action is within the threshold range.

The threshold data may indicate that the sensing data related to the action is outside of the threshold range, and the processor may be further configured to execute the instructions to generate the event based on the threshold data.

The event may include at least one of: a first feedback notifying that the sensing data related to the action is outside of the threshold range, an instruction configured to control hardware elements of the robot device such that the sensing data related to the action is within the threshold range, and a second feedback identifying a hardware element from among the hardware elements of the robot device wherein an error occurred, based on the sensing data related to the action.

The processor may be further configured to execute the instructions to, based on a test mode being executed, replay the action based on the instruction data stored in the memory and the sensing data stored in the memory corresponding to the instruction data, or replay the action based on the instruction data stored in the memory and other sensing data received from the server corresponding to the instruction data.

The processor may be further configured to execute the instructions to: convert the instruction data and the sensing data into converted data in a robot programming language format, store the converted data in the memory, and transmit the converted data to the server via the communication interface.

According to an aspect of the disclosure, a robot device system includes: a robot device configured to, based on an action of the robot device changing, store action data including instruction data corresponding to the action, sensing data related to the action and generated by a sensor of the robot device, and map data related to the action; and a server configured to identify a threshold range of the sensing data related to the action based on the action data received from the robot device, and transmit, to the robot device, threshold data related to the identified threshold range, wherein the robot device is further configured to generate an event, based on identifying that the sensing data is outside of the threshold range based on the threshold data received from the server.

The server may be further configured to: receive, from the robot device, instruction data and sensing data corresponding to each of a plurality of actions, and identify a threshold range of each of the plurality of actions, based on the received instruction data and sensing data.

The threshold data may include information regarding the threshold range of the sensing data corresponding to each of a plurality of actions of the robot device.

The threshold data may include information indicating that the sensing data related to the action is outside of the threshold range.

According to an aspect of the disclosure, a control method for a robot device includes: storing, in a memory of the robot device, action data corresponding to an action of the robot device, based on the action of the robot device changing, the action data including instruction data corresponding to the action, sensing data related to the action, and map data related to the action; transmitting the stored data to a server; receiving, from the server, threshold data corresponding to the action data; and based on identifying that the sensing data is outside of a threshold range based on the threshold data received from the server, generating an event.

The instruction data may be in a robot programming language format, and may be configured to control at least one of a driving distance, a driving direction, or a driving speed of the robot device, and the control method may further include controlling the robot device to generate the action based on the instruction data.

The sensing data may include operation data generated in hardware elements of the robot device during performing of the action by the robot device, the map data may include information on an object located in a specific place that the robot device is located, and the information on the object may include at least one of location information of the object, size information of the object, shape information of the object, or characteristic information of the object.

The threshold data received from the server may include threshold range values of sensing data for each action of the robot device, the threshold range values having been acquired according to an analysis of the action data transmitted to the server, and the generating of the event may include identifying whether the sensing data related to the action is within the threshold range.

The threshold data may indicate that the sensing data related to the action is outside of the threshold range, and the generating of the event may include generating the event based on the threshold data.

The event may include at least one of: a first feedback notifying that the sensing data related to the action is outside of the threshold range, an instruction configured to control hardware elements of the robot device such that the sensing data related to the action is within the threshold range, and a second feedback identifying a hardware element from among the hardware elements of the robot device wherein an error occurred, based on the sensing data related to the action.

The control method may further include, based on a test mode being executed, replaying the action based on the instruction data stored in the memory and the sensing data stored in the memory corresponding to the instruction data, or replaying the action based on the instruction data stored in the memory and other sensing data received from the server corresponding to the instruction data.

The storing of the action data in the memory may include: converting the instruction data and the sensing data into converted data in a robot programming language format; storing the converted data in the memory; and transmitting the converted data to the server.

According to the various embodiments of the disclosure, a log file may be stored when an action of the robot device occurs.

Also, by using a log file of a low capacity, an operation part of the robot device that drove differently from what was predicted may be replayed easily.

In addition, by using a robot programming language, the driving history of the robot device may be replayed without a separate interpreter.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
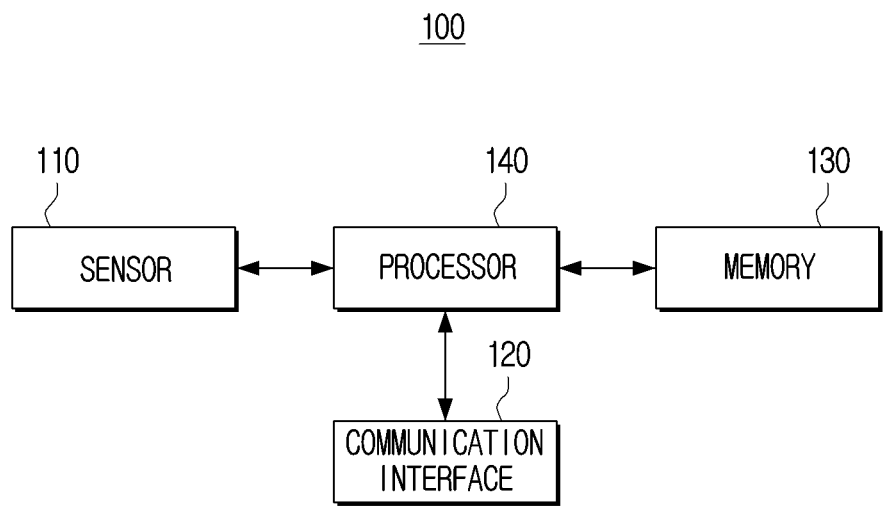
FIG. 1 is a block diagram illustrating a configuration of a robot device according to an embodiment of the disclosure.

Hereinafter, embodiments of the disclosure will be described in detail with reference to the accompanying drawings. As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. In particular cases, there may be terms that were designated by the Applicant on his own, and in such cases, the meaning of the terms are be described in detail in the relevant descriptions in the disclosure. Accordingly, the terms used in the disclosure should be defined based on the meaning of the terms and the overall content of the disclosure, but not just based on the names of the terms.

Herein, expressions such as "have," "may have," "include," and "may include" denote the existence of such characteristics (e.g., elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second" and the like as used in the disclosure may be used to describe various elements regardless of any order and/or degree of importance. Such expressions may be used only to distinguish one element from another element, and are not intended to limit the elements.

A description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element).

In addition, singular expressions include plural expressions, unless defined differently in the context. Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In the disclosure, "a module" or "a part" performs at least one function or operation, and may be implemented as hardware or software, or as a combination of hardware and software. Further, a plurality of "modules" or "parts" may be integrated into at least one module and implemented by at least one processor, except "modules" or "parts" which need to be implemented by specific hardware.

In addition, herein, the term "user" may refer to a person who uses an electronic device or a device using an electronic device (e.g., an artificial intelligence electronic device).

Hereinafter, various embodiments of the disclosure are described in more detail with reference to the accompanying drawings.

FIG. 1 is a block diagram illustrating a configuration of a robot device according to an embodiment of the disclosure.

As shown in FIG. 1, a robot device 100 according to an embodiment of the disclosure may refer to machines in various forms that have the capability of performing a work function by themselves. As an example, a robot may be a smart device that detects the surrounding environment in real time, based on a sensor, a camera, etc., and collects information and operates autonomously, performing operations other than simple repetitive functions. However, this is merely an example, and the disclosure is not limited thereto.

The various embodiments of the disclosure may be implemented through an electronic device. Here, the electronic device may be implemented as at least one device in one or more of various forms, such as, but not limited to, a user terminal device, a display device, a set-top box, a tablet personal computer (PC), a smart phone, an e-book reader, a desktop PC, a laptop PC, a workstation, a server, a personal digital assistant (PDA), a portable multimedia player (PMP), a Moving Picture Experts Group (MPEG) Audio Layer-3 (MP3) player, a kiosk, etc. However, these are merely examples, and the electronic device may also be implemented as electronic devices in other various types such as a wearable device falling under at least one form among an accessory-type device (e.g., a watch, a ring, a bracelet, an ankle bracelet, a necklace, glasses, a contact lens, and/or a head-mounted-device (HMD)), a device integrated with fabrics or clothing (e.g., electronic clothing), a robot including an operation part, a projector, a server, etc. Hereinafter, for the convenience of explanation, description will be made on the assumption of a case wherein the various embodiments of the disclosure are implemented by the robot device 100.

Figure 2:
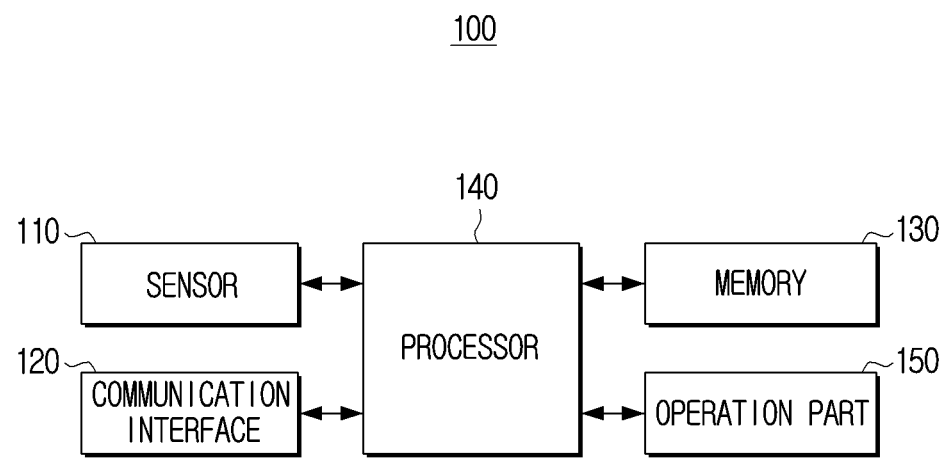
FIG. 2 is a detailed block diagram of a robot device according to an embodiment of the disclosure.

The robot device 100 may include an operation part including an actuator or a motor (e.g., operation part 150 of FIG. 2). Here, the operation part 150 may include a wheel, a brake, etc. In some embodiments, the robot device 100 may be implemented as a mobile robot that may move in a specific place (e.g., a building, a home, a business such as, but not limited to, a restaurant, a hotel, a store, a hospital, a warehouse) by itself by using the operation part 150. For example, if the robot device 100 determines that there is an obstacle in the front, the robot device 100 may rotate its main body to the right side or the left side and then make the main body go forward, or make the main body go backward, by using the operation part 150.

Also, the operation part 150 may move a component (e.g., a robot joint) of the robot device 100 for replacing the functions of a human arm or hand, other than the main body. The robot device 100, according to an embodiment of the disclosure, may generate or change an action of the robot device 100 by using the operation part 150. Here, the action may include the moving and the movement of the robot device 100. For example, the robot device 100 may drive or rotate the robot device 100 by controlling the operation part 150. As another example, the robot device 100 may perform operations such as moving an external object, or gripping an external object, by controlling the operation part 150. That is, the action may include various operations and functions that the robot device 100 may perform.

In some embodiments, the robot device 100 may be divided into an industrial use, a medical use, a household use, a military use, an exploration use, etc., according to fields or performable functions. According to an embodiment, industrial robots may be subdivided into a robot used in a product manufacturing process in a factory, a robot performing serving of guests (e.g., receiving orders, serving, etc., in a shop, a restaurant, etc.), and the like. For example, the robot device 100, according to an embodiment of the disclosure, may be implemented as a serving robot that may carry service goods to a location desired by a user, and/or a specific location in various places such as a restaurant, a hotel, a mart, a hospital, a clothing shop, etc. However, these are merely examples, and the robot device 100 may be classified in various ways according to fields of application, functions, and purposes of uses, and are not limited to the aforementioned examples.

Continuing to refer to FIG. 1, the robot device 100, according to an embodiment of the disclosure, includes a sensor 110, a communication interface 120, a memory 130, and a processor 140.

In some embodiments, the sensor 110 may be implemented as a detection sensor. The sensor 110 may sense actual operations of the operation part 150 and the components according to an action of the robot device 100, and generate sensing data. The sensing data may include operation data generated by hardware elements provided in the robot device 100 as an action of the robot device 100 occurs. Here, the sensing data may also be referred to as a log file or operation data, but is generally referred to as sensing data, for the convenience of explanation.

For example, when the robot device 100 performs an action of a left side rotation, the sensor 110 may sense actual operations of the operation part 150 according to the action of the left side rotation (e.g., the rotation angle, the rotation speed, the moving directions of each of the left side wheel and the right side wheel, etc.), and generate sensing data. As another example, if the robot device 100 performs an action of forward driving, the sensor 110 may sense actual operations of the operation part 150 according to the action of forward driving (e.g., the driving direction, the driving speed, etc.), and generate sensing data. However, these are merely examples, and the sensor 110 may sense actual operations of each of the components included in the robot device 100 according to an action of the robot device 100, and generate sensing data.

In some embodiments, the sensor 110 may be a component for acquiring one or more images from the surroundings. For example, the sensor 110 may be a red-green-blue (RGB) camera, a three-dimensional (3D) camera, etc. The processor 140, according to an embodiment, may acquire map data based on the sensing data of the sensor 110. That is, the map data may include information on an object in a specific place (e.g., geographical location) based on where the robot device 100 is located.

In some embodiments, the sensor 110 may be implemented as an ultrasonic sensor, an infrared sensor, etc. In a case that the detection sensor is implemented as an ultrasonic sensor, the processor 140 may control the ultrasonic sensor to radiate an ultrasonic pulse. In such a case, when a reflective wave is received from the ultrasonic pulse being reflected on an object, the processor 140 may measure the elapsed time between the radiation of the ultrasonic pulse and the reception of the reflective wave, and thereby measure the distance between the object and the processor 140. Alternatively or additionally, the ultrasonic sensor may include an ultrasonic proximity sensor, and may be implemented in various ways. An infrared sensor may refer to an element that detects infrared light information included by an object. The processor 140 may identify an object based on the sensing data (e.g., infrared light information, distance information) of the sensor 110.

The disclosure is not limited thereto, and the sensor 110 may be implemented as sensors in various forms. For example, the sensor 110 may include an radio-frequency (RF) sensor, a geomagnetic sensor, a position sensitive device (PSD) sensor, a sensor that detects a cliff within a driving path, a light detection and ranging (LIDAR) sensor, etc.

In some embodiments, the processor 140 may acquire map data by identifying the location of the robot device 100 within a specific place (e.g., a building, a home, a business such as, but not limited to, a restaurant, a hotel, a store, a hospital, a warehouse), an object near the robot device 100, etc., based on the sensing data of the sensor 110.

In some embodiments, the map data may include object information such as, at least one of location information of the object within a specific place, size information, shape information, and characteristic information. The size information may include at least one of information on the width, the height, and the length of the object, and the shape information may include a representative image, a plan-view shape (or a top-view), etc., of the object. Also, the characteristic information of the object may include information on whether the object may be climbed, or a threshold distance between the robot device 100 and the object in case the robot device 100 drives while avoiding the object (or, drives to follow the object), etc.

In some embodiments, the processor 140 may analyze whether there is an object, a location of an object, a distance with an object, etc., based on the sensing data of the sensor 110, and generate instruction data for generating an action of the robot device 100 based on the analysis result.

In some embodiments, the instruction data may be data in a robot programming language format for controlling at least one of a driving distance, a driving direction, and a driving speed of the robot device 100. However, this is merely an example, and the disclosure is not limited thereto. For example, the instruction data may be data in a robot programming language format for controlling a rotation direction, a rotation angle, or a rotation speed of the robot device 100, or movements of each of the plurality of components provided in the robot device 100.

For example, the processor 140 may generate instruction data in a robot programming language format that may be interpreted by the robot device 100 such that the robot device 100 performs a specific action. As an example, when an object (e.g., an obstacle) is identified in the front side of the robot device 100, the processor 140 may generate instruction data for making the robot device 100 drive to rotate to the right side or the left side, or for making the robot device 100 go backward. In such an example, the instruction data may include instructions regarding an action of driving to rotate to the right side, an action of driving to rotate to the left side, or an action of driving to go backward, etc.

Then, the processor 140 may control the operation part 150 and/or the components of the robot device 100, etc., such that the robot device 100 performs a specific action corresponding to the instruction data. In some embodiments, the instruction data may be referred to as command data including instructions, but may be generally referred to as instruction data for the convenience of explanation.

The communication interface 120, according to an embodiment of the disclosure, may transmit and/or receive data by performing communications with an external device (e.g., a source device, an external user terminal), an external storage medium (e.g., a universal serial bus (USB) memory), an external server (e.g., a web hard server), etc., through communication methods such as Wireless-Fidelity (Wi-Fi) based on an access point (AP) (e.g., a wireless local area network (LAN)), Bluetooth, Zigbee, a wired/wireless LAN, a wide area network (WAN), Ethernet, an Institute of Electrical and Electronics Engineers (IEEE) 1394 interface, a high-definition multimedia interface (HDMI), a USB interface, a Mobile High-Definition Link (MHL), AES/EBU (Audio Engineering Society/European Broadcasting Union), optical interface, coaxial interface, etc.

In some embodiments, the robot device 100 may perform communication in a peer-to-peer (P2P) form with another electronic device through the communication interface 120, and share communication. As an example, the robot device 100 may perform communication with another electronic device in an ad-hoc mode of transmitting and/or receiving information in a P2P form between devices without an AP.

The processor 140, according to an embodiment of the disclosure, may transmit data to a server (e.g., server 200 of FIG. 9) through the communication interface 120, and receive data from the server. A more detailed explanation in this regard is made with reference to FIG. 9.

According to an embodiment of the disclosure, the memory 130 provided in the robot device 100 may be implemented as an internal memory such as a read-only memory (ROM) (e.g., an electrically erasable programmable read-only memory (EEPROM)), a random-access memory (RAM), etc., included in the processor 140, or implemented as a separate memory from the processor 140. The memory 130 may be implemented in the form of a memory embedded in the robot device 100, and/or implemented in the form of a memory that may be attached to and/or detached from the robot device 100 according to the use of stored data. For example, in the case of data for operating the robot device 100, the data may be stored in a memory embedded in the robot device 100, and in the case of data for an extended function of the robot device 100, the data may be stored in a memory that may be attached to and/or detached from the robot device 100.

In the case of a memory embedded in the robot device 100, the memory may be implemented as at least one of a volatile memory (e.g., a dynamic RAM (DRAM), a static RAM (SRAM), or a synchronous dynamic RAM (SDRAM), etc.) and a non-volatile memory (e.g., an one time programmable ROM (OTPROM), a programmable ROM (PROM), an erasable and programmable ROM (EPROM), an EEPROM, a mask ROM, a flash ROM, a flash memory (e.g., NAND flash, NOR flash, etc.), a hard drive, or a solid state drive (SSD)). In the case of a memory that may be attached to and/or detached from the robot device 100, the memory may be implemented as forms such as a memory card (e.g., compact flash (CF), secure digital (SD), micro secure digital (Micro-SD), mini secure digital (Mini-SD), extreme digital (xD), a multi-media card (MMC), etc.), an external memory that may be connected to a USB port (e.g., a USB memory), etc.

In some embodiments, if an action of the robot device 100 is changed according to control by the processor 140, the processor 140 may store instruction data corresponding to the action, sensing data of the sensor 110 related to the action, and map data related to the action in the memory 130. Here, the sensing data of the sensor 110 related to the action and the map data related to the action may respectively refer to sensing data and map data on the time point when the action of the robot device 100 was changed. For example, if an action of the robot device 100 is changed, the processor 140 may store instruction data corresponding to the action, and sensing data and map data on the time point when the action was changed in the memory 130. Here, the map data may include information on an object adjacent to the robot device 100 on the time point when the action was changed.

The processor 140 controls the overall operations of the robot device 100.

According to an embodiment, the processor 140 may be implemented as a digital signal processor (DSP) processing digital image signals, a microprocessor, an artificial intelligence (AI) processor, and/or a timing controller (T-CON). However, the disclosure is not limited thereto, and the processor 140 may include one or more of a central processing unit (CPU), a micro controller unit (MCU), a micro processing unit (MPU), a controller, an application processor (AP), or a communication processor (CP), and an advanced reduced instruction set computer (RISC) machine (ARM) processor. Alternative or additionally, the processor 140 may be implemented as a system on chip (SoC) having a processing algorithm stored therein or large scale integration (LSI), or in the form of a field programmable gate array (FPGA).

The processor 140 according to an embodiment of the disclosure may control the operation of the robot device 100 based on map data for a specific place (e.g., geographical location) sensed by the sensor 110. For example, the map data for a specific place may refer to data indicating the physical geography of the place wherein the robot device 100 is operated, and it may be an image form, but is not limited thereto.

The processor 140 may generate instruction data for controlling the action of the robot device 100 based on information on an object included in the map data, section information of each of a plurality of sections constituting a place, etc. For example, the instruction data may be data in a robot programming language format for controlling at least one of a driving distance, a driving direction, and a driving speed of the robot device 100.

As an example, if a place is a restaurant, an object may be a table, a seat on which a user may sit, or physical obstacles in various forms. The map data may include identification information and location information of a table, a seat, etc., provided in the place. As another example, if a place is a home, an object may refer to furniture, a home appliance, or obstacles in various forms.

Here, an obstacle may refer to various kinds of objects or situations that may interfere with the driving of the robot device 100, that may cause stopping of the operation between driving of the robot device 100, or that may cause damage and/or breakage of the robot device 100. For example, an obstacle may include various objects such as a rug, clothes, a wall surface, a step, a threshold, etc., other than furniture and electronic devices.

In some embodiments, section information of each of a plurality of sections constituting a place may refer to information for identifying each of the plurality of sections. For example, in case a specific place is a restaurant, section information may include identification information, location information, and size information, etc., regarding the kitchen, the payment area, and the hall area provided in the restaurant.

Map data may be received from an external server (not shown) and stored in the memory 130. Alternatively or additionally, the map data may be acquired based on sensing data (e.g., an image) acquired through the sensor 110 (e.g., a camera) included in the robot device 100.

The processor 140 according to an embodiment of the disclosure may control the hardware elements of the robot device 100 based on instruction data (e.g., data in a robot programming language format) and generate an action. Here, the action may include various movements that the robot device 100 may perform according to the purpose of the robot device 100, such as an action for driving while avoiding an obstacle, etc., based on map data, an action for performing cleaning, an action for carrying an object, etc. A more detailed description in this regard is made with reference to FIG. 3.

Figure 3:
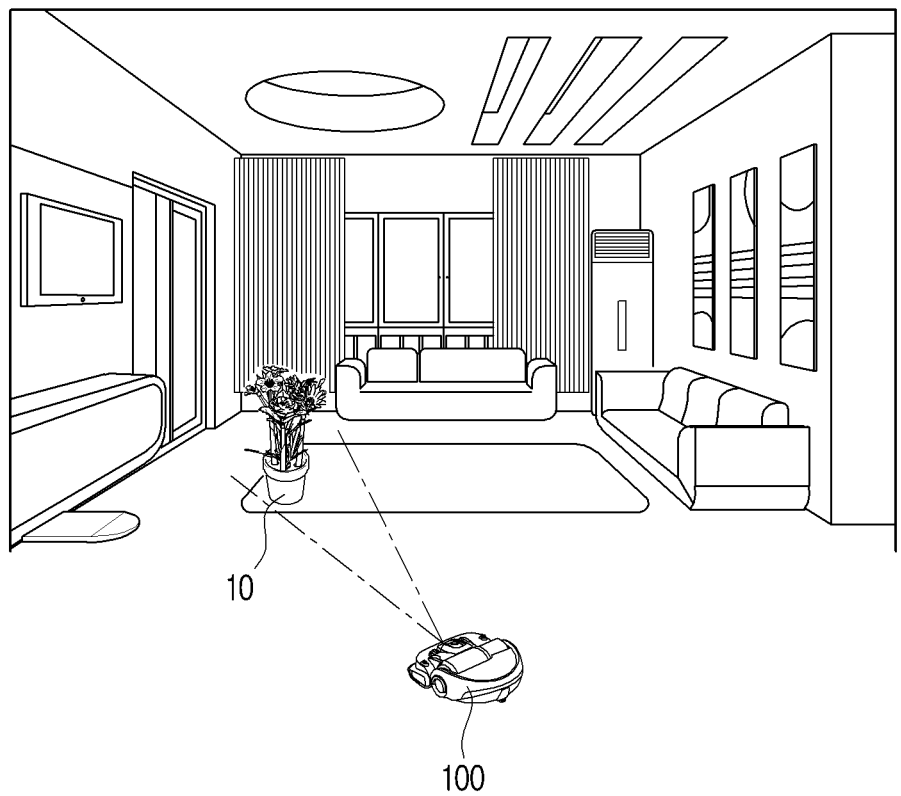
FIG. 3 is a diagram for illustrating data according to an embodiment of the disclosure.

FIG. 3 is a diagram for illustrating data according to an embodiment of the disclosure.

Referring to FIG. 3, if an object 10 (e.g., an obstacle) is identified in the front side of the robot device 100 based on sensing data, the processor 140 according to an embodiment of the disclosure may generate instruction data for making the robot device 100 drive to rotate to the right side or the left side, or for making the robot device 100 go backward.

The processor 140 may control the driving part, the components, etc. such that the robot device 100 performs a specific action corresponding to the instruction data. Referring to FIG. 3, the processor 140 may control the hardware elements of the robot device 100 based on the instruction data, and generate an action of driving to rotate to the right side.

Here, if the action of the robot device 100 changes from an action of driving straight to an action of driving to rotate to the right side, the processor 140 may store the instruction data on the time point when the action changed, the sensing data including the operation data generated in the hardware elements on the time point when the action changed, and the map data on the time point when the action changed in the memory 130.

As another example, if the action of the robot device 100 changes from an action of driving straight to an action of driving to rotate to the right side, the processor 140 may store the instruction data corresponding to the changed action (i.e., the action of driving to rotate to the right side), the operation data generated in the hardware elements according to performing of the changed action, and the map data related to the changed action in the memory 130. Here, the operation data may refer to data generated as the hardware elements such as the motor, the wheel, etc. are driven for the robot device 100 to perform the action.

In some embodiments, the processor 140 may selectively and/or optionally store at least one of the instruction data, the sensing data, and the map data. For example, the processor 140 may store only the sensing data, or map the instruction data and the sensing data and store them. As another example, the processor 140 may map the instruction data, the sensing data, and the map data, and store them in the memory 130.

Figure 4:
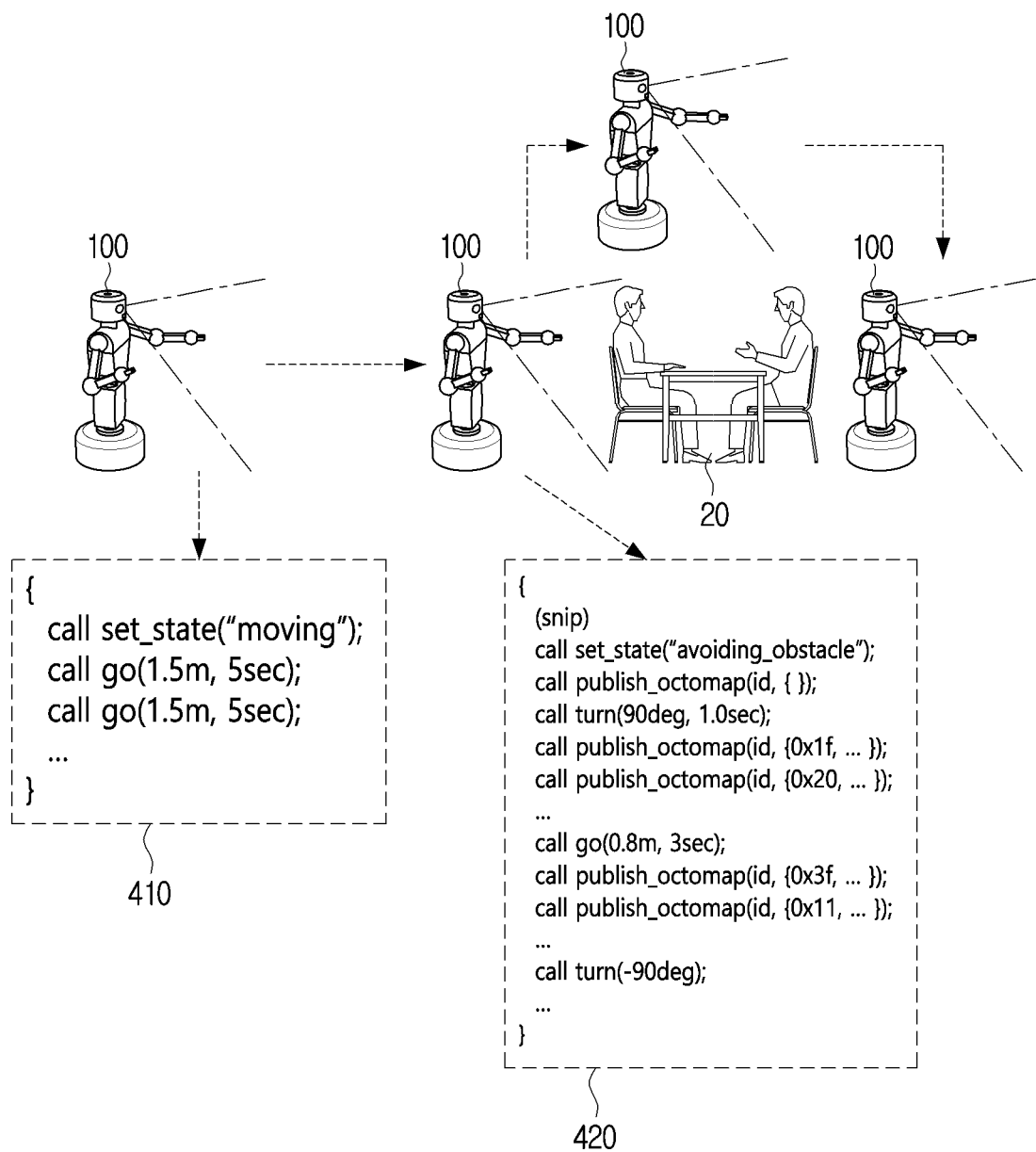
FIG. 4 is a diagram for illustrating instruction data and sensing data according to an embodiment of the disclosure.

FIG. 4 is a diagram for illustrating instruction data and sensing data according to an embodiment of the disclosure.

Referring to FIG. 4, the processor 140 according to an embodiment of the disclosure may acquire, based on map data, instruction data in a robot programming language format that may be interpreted by the robot device 100.

As an example, the processor 140 may generate "moving" instruction data 410 such that the robot device 100 performs an action of forward driving. Then, if an obstacle 20 is detected in the front side based on map data, the processor 140 may generate "avoiding_obstacle" instruction data 420 such that the robot device 100 performs an action of driving to avoid the obstacle 20.

In some embodiments, the processor 140 may control the hardware elements based on the instruction data, and perform an action. Then, the processor 140 may acquire operation data generated in the hardware elements of the robot device 100. Here, the operation data may refer to data related to actual operations of the hardware elements according to performing of the action.

If the action of the robot device 100 changes, the processor 140 according to an embodiment of the disclosure may store the instruction data, the sensing data, and the map data in the memory 130. Then, the processor 140 may transmit the data stored in the memory 130 to the server through the communication interface 120. For example, if the action of the robot device 100 changes from "moving" to "avoiding_obstacle," the processor 140 may store the instruction data corresponding to the changed action, the sensing data including the operation data of the hardware elements according to performing of the action, and the map data related to the action in the memory 130.

If it is identified that the sensing data corresponding to an action that occurred in the robot device 100 does not belong to (e.g., is not within, is outside of) a threshold range based on data received from the server, the processor 140 according to an embodiment of the disclosure may generate an event. For example, the data received from the server may include the data for a threshold range of the sensing data for each action that may occur in the robot device 100, which was acquired by analyzing the data transmitted from the robot device 100 to the server. The threshold range may refer to an error range and/or a normal range, but for the convenience of explanation, it is generally referred to as a threshold range.

For example, the processor 140 may transmit instruction data (e.g., 420) corresponding to an action "avoiding_obstacle," sensing data including the operation data of the hardware elements according to performing of the action "avoiding_obstacle," and map data related to the action "avoiding_obstacle" to the server. Then, the processor 140 may acquire data for the threshold range of the sensing data related to the action "avoiding_obstacle" based on the data received from the server.

For example, the server may receive a plurality of sensing data for each action from a plurality of robot devices. Then, the server may analyze the plurality of sensing data and acquire data for the threshold range of the sensing data for each action.

As an example, if sensing data corresponding to the action "avoiding_obstacle" is received from each of the plurality of robot devices, the server may analyze the plurality of sensing data, and acquire standard sensing data corresponding to the action "avoiding_obstacle." For example, the server may analyze the plurality of sensing data, and acquire standard sensing data through combination of the most probable operation data, or acquire sensing data received from a specific robot device 100 as standard sensing data. Then, the server may transmit the standard sensing data for each action that may occur in the robot device 100 and threshold similarity with the standard sensing data to the robot device 100.

Then, the robot device 100 may measure a similarity between the received standard sensing data and the sensing data stored in the memory 130, and identify whether the similarity is greater than or equal to the threshold similarity (e.g., whether the similarity belongs to the threshold range). For example, if the threshold similarity is 95%, the robot device 100 may compare the standard sensing data and the sensing data stored in the memory 130, and determine whether the similarity is greater than or equal to 95% according to the comparison result. Here, as a method for determining similarity, a known method of measuring similarity may be used. However, this is merely an example, and the disclosure is not limited thereto.

For example, if a plurality of sensing data for a specific action is collected, the server may analyze the plurality of sensing data, and acquire standard sensing data according to normal operations of the hardware elements included in the robot device 100, wherein errors did not occur. As an example, the server may acquire standard sensing data from a plurality of sensing data based on a learning network model or an algorithm, and transmit the data to the robot device 100. The learning network model may be an artificial intelligence model which went through machine learning (e.g., trained) based on the plurality of sensing data for each action.

Functions related to artificial intelligence according to the disclosure may be operated through the processor 140 and the memory 130. The processor 140 may consist of one or a plurality of processors. Here, the one or plurality of processors may be generic-purpose processors such as a CPU, an AP, a DSP, etc., graphic-dedicated processors such as a GPU and a vision processing unit (VPU), and/or artificial intelligence-dedicated processors such as a neural processing unit (NPU). The one or plurality of processors may perform control to process input data according to predefined operation rules and/or an artificial intelligence model stored in the memory. Alternatively, in case the one or plurality of processors are artificial intelligence-dedicated processors, the artificial intelligence-dedicated processors may be designed as a hardware structure specific for processing of a specific artificial intelligence model.

The predefined operation rules and/or the artificial intelligence model may be characterized in that they are made through learning (e.g., machine learning, deep learning). That is, being made through learning may refer to a basic artificial intelligence model being trained by using a plurality of learning data by a learning algorithm, and the predefined operations rules and/or the artificial intelligence model set being created to perform desired characteristics (e.g., purposes). Such learning may be performed in a device itself wherein artificial intelligence is performed according to the disclosure, and/or through a separate server and/or a system. As examples of learning algorithms, there are supervised learning, unsupervised learning, semi-supervised learning, or reinforcement learning, but learning algorithms in the disclosure are not limited to the aforementioned examples.

An artificial intelligence model may consist of a plurality of neural network layers. Each of the plurality of neural network layers may have a plurality of weight values, and may perform a neural network operation through an operation result of the previous layer and an operation among the plurality of weight values. The plurality of weight values included by the plurality of neural network layers may be optimized by the learning result of the artificial intelligence model. For example, the plurality of weight values may be updated such that a loss value and/or a cost value acquired at the artificial intelligence model during a learning process is reduced or minimized. An artificial neural network may include a deep neural network (DNN), a convolutional neural network (CNN), a recurrent neural network (RNN), a restricted Boltzmann Machine (RBM), a deep belief network (DBN), a bidirectional recurrent deep neural network (BRDNN), deep Q-networks, etc., but the disclosure is not limited to the aforementioned examples.

Then, if it is identified that sensing data corresponding to an action occurred in the robot device 100 does not belong to (e.g., is not within, is outside of) the threshold range based on the data received from the server, the robot device 100 according to an embodiment of the disclosure may generate an event. A more detailed description in this regard is made with reference to FIG. 5.

Figure 5:
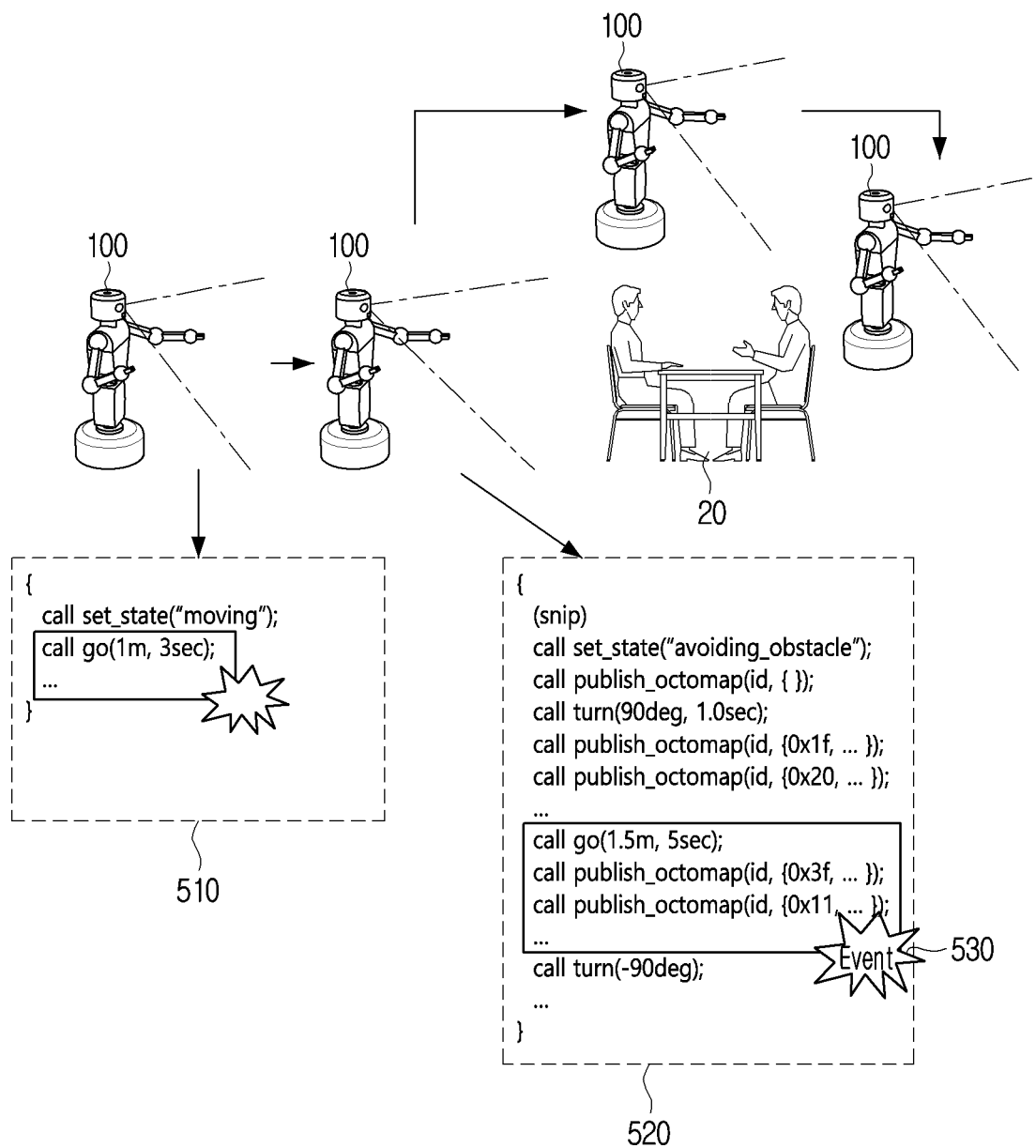
FIG. 5 is a diagram for illustrating a threshold range according to an embodiment of the disclosure.

FIG. 5 is a diagram for illustrating a threshold range according to an embodiment of the disclosure.

Referring to FIG. 5, as the robot device 100 performs an action, the processor 140 according to an embodiment of the disclosure may acquire sensing data including data regarding operation of the hardware elements (e.g., the operation data).

In some embodiments, the processor 140 may receive data from the server. Here, the data received from the server may include data for the threshold range of the sensing data for each action.

The data for the threshold range of the sensing data for each action may include the standard sensing data for each action and the data regarding the threshold similarity. In some embodiments, the processor 140 may compare sensing data related to an action and the standard data related to the action, and identify similarity. Then, if the similarity is smaller than the threshold similarity, the processor 140 may identify that the sensing data corresponding to the action occurred in the robot device 100 does not belong to (e.g., is not within, is outside of) the threshold range.

Referring to FIG. 5, if a similarity between the sensing data corresponding to the action "avoiding_obstacle" performed in the robot device 100 and the standard sensing data of the action "avoiding_obstacle" is smaller than the threshold similarity, the processor 140, according to an embodiment of the disclosure, may identify that the sensing data does not belong to (e.g., is not within, is outside of) the threshold range, and generate an event 530.

The event 530 may include at least one of a feedback notifying that the sensing data corresponding to the action occurred in the robot device 100 does not belong to (e.g., is not within, is outside of) the threshold range, an instruction (e.g., 510 or 520) controlling the hardware elements of the robot device 100 such that the sensing data corresponding to the action belongs to (e.g., is within) the threshold range, and an event notifying an element wherein an error occurred among the hardware elements of the robot device 100 based on the sensing data corresponding to the action.

As an example, if the sensing data corresponding to a specific action performed in the robot device 100 has a similarity smaller than the threshold similarity with the standard sensing data corresponding to the specific action, the processor 140 may identify that an error occurred in the robot device 100. The processor 140 may provide at least one of a visual feedback and an auditory feedback notifying that the sensing data corresponding to the action does not belong to (e.g., is not within, is outside of) the threshold range.

As another example, the processor 140 may generate an action controlling the hardware elements such that the sensing data corresponding to the action belongs to (e.g., is within) the threshold range. For example, if the driving speed in the standard sensing data of an action "moving" is 0.5 meters per second (m/s), and the driving speed in the sensing data generated as the robot device 100 performs the action "moving" is 0.1 m/s, the processor 140 may generate an instruction for changing the driving speed to 0.5 m/s by controlling the wheel and the motor provided in the driving part.

As still another example, if the sensing data corresponding to a specific action performed in the robot device 100 has a similarity smaller than the threshold similarity with the standard sensing data corresponding to the specific action, the processor 140 may generate an event 530 notifying that an error (or, an obstacle 20) occurred in the hardware elements of which control is required for performing the specific action. For example, if the driving speed in the standard sensing data of an action "moving" is 0.5 m/s, and the driving speed in the sensing data generated as the robot device 100 performs the action "moving" is 0.1 m/s, the processor 140 may provide a visual feedback or an auditory feedback notifying that an error occurred in the wheel, the motor, etc. provided in the driving part.

Figure 6:
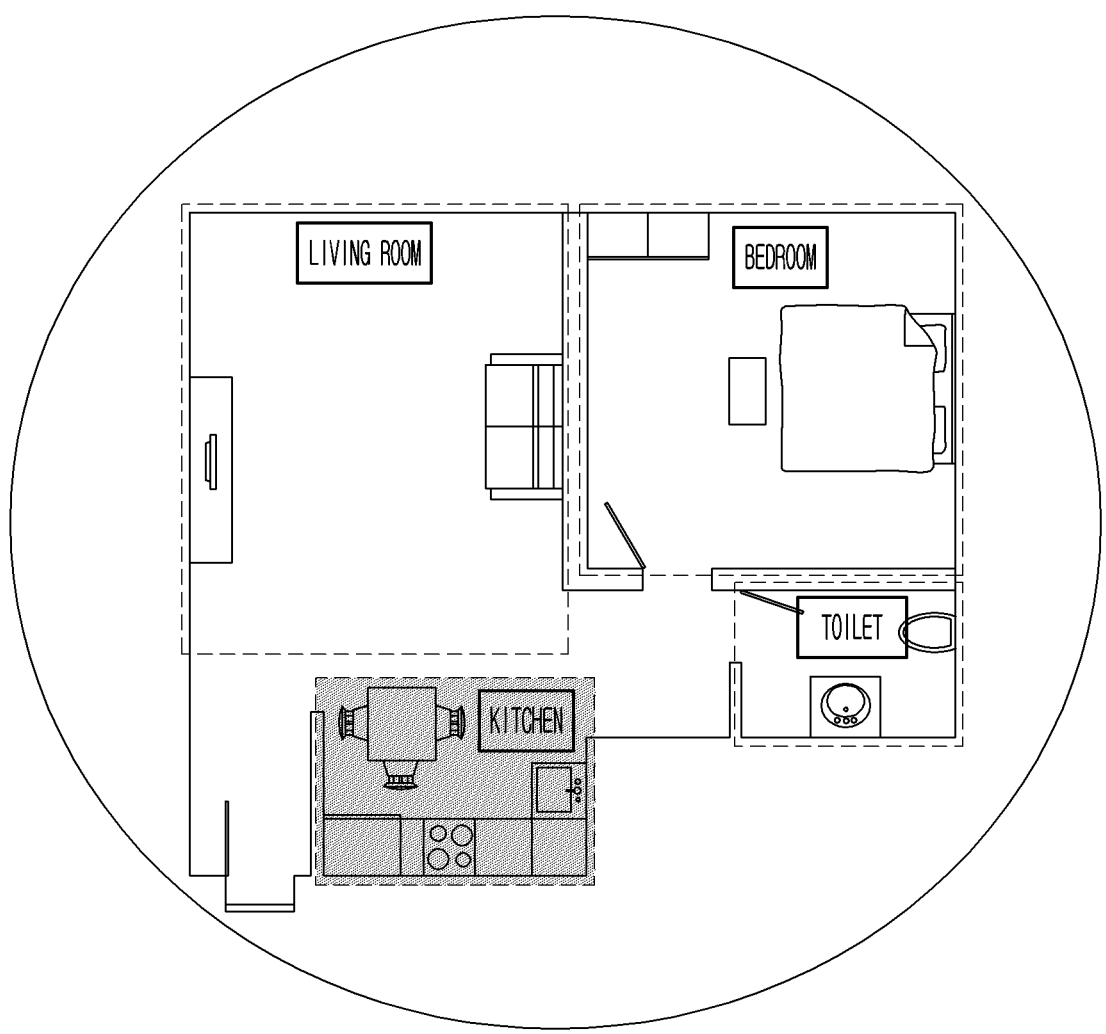
FIG. 6 is a diagram for illustrating map data according to an embodiment of the disclosure.

FIG. 6 is a diagram for illustrating map data according to an embodiment of the disclosure.

Referring to FIG. 6, the processor 140 according to an embodiment of the disclosure may acquire map data including information on an object based on the sensing data of the sensor 110 while the robot device 100 is moving (or, driving).

In some embodiments, the information on the object may include at least one of location information of the object within a specific place, size information, shape information, and characteristic information. The size information may include at least one of information on the width, the height, and the length of the object, and the shape information may include a representative image, a plan-view shape (and/or a top-view), etc., of the object. Also, the characteristic information of the object may include information on whether the object may be climbed, or a threshold distance between the robot device 100 and the object in case the robot device 100 drives while avoiding the object (or, drives to follow the object), etc.

The processor 140, according to an embodiment of the disclosure, may acquire information on an object by using an artificial intelligence model stored in the memory 130. For example, an artificial intelligence model trained to identify an object in an input image may be stored in the memory 130. In some embodiments, the artificial intelligence model may be a model trained by using a plurality of sample images including various objects. Identifying an object may be understood to refer to acquiring information on the object such as the name, the type, the size information, the shape information, the characteristic information, etc., of the object.

In some embodiments, the processor 140 may acquire instruction data corresponding to the object based on the information on the object.

For example, if an obstacle that cannot be climbed is detected in the front side, the processor 140 may acquire instruction data for driving while avoiding the obstacle. As another example, if an obstacle that may be climbed is detected in the front side, the processor 140 may acquire instruction data for driving to climb over the obstacle.

If an action of the robot device 100 changes based on information on an object (e.g., map data), the processor 140 may transmit instruction data corresponding to the action, sensing data including operation data generated as the action is performed, and map data including the information on the object to the server.

Figure 7:
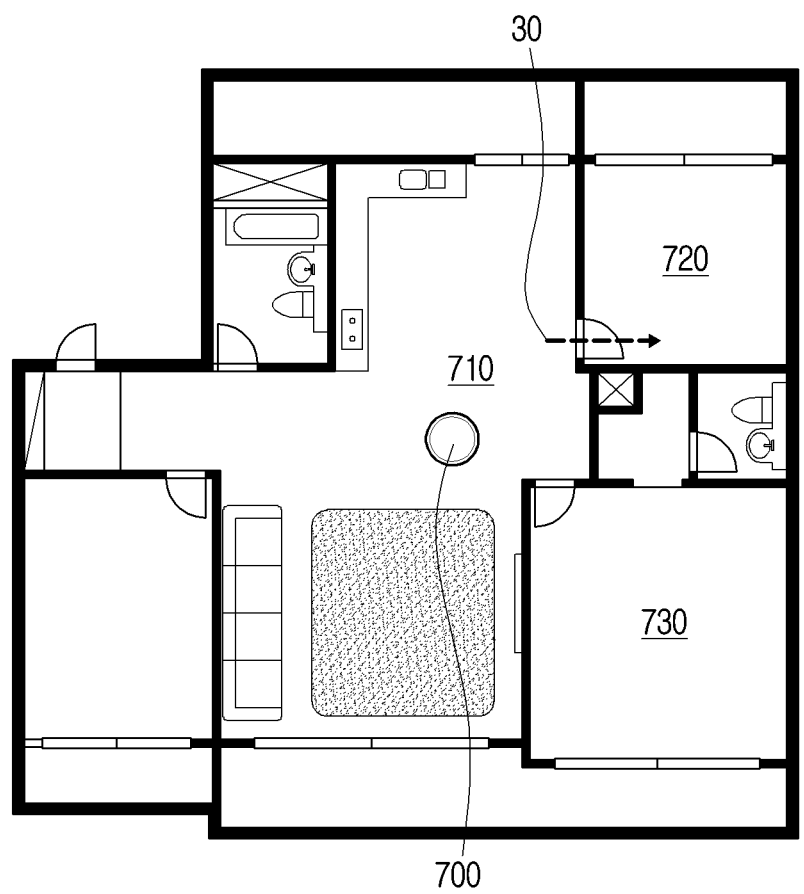
FIG. 7 is a diagram for illustrating a case of replaying driving of a robot device according to an embodiment of the disclosure.

FIG. 7 is a diagram for illustrating a case of replaying driving of a robot device 100 according to an embodiment of the disclosure.

Referring to FIG. 7, a case wherein the robot device 100 according to an embodiment of the disclosure is implemented as a robot cleaner 700 may be assumed.

The robot cleaner 700 may identify objects such as a point where there is a dividing line or a raised spot on the bottom, a point where the movable width narrows, a point where there is a wall, a point where a wall starts, a point where a wall ends, a point where there is a door, etc., based on the sensing data of the sensor 110. The processor 140 may divide a place (e.g., a home) into a plurality of sections (e.g., a living room, a bedroom, a toilet, or a kitchen, etc.) with the identified points as boundaries among the sections.

In some embodiments, the robot cleaner 700 may perform cleaning while moving in the plurality of sections sequentially.

Referring to FIG. 7, the robot cleaner 700, according to an embodiment of the disclosure, may perform cleaning by cleaning the first area 710 (e.g., the kitchen), and then moving to the next section.

According to an embodiment of the disclosure, the processor 140 may make the robot cleaner 700 drive based on the sensing data of the sensor 110. Referring to FIG. 7, a case wherein the robot cleaner 700 cleans the first area 710 (e.g., the kitchen), and then performs an action to rotate to the left side for moving to the second area 720 may be assumed.

As the action of the robot cleaner 700 was changed from an action of driving straight to an action of rotating to the left side (e.g., as illustrated by arrow 30), the processor 140 may store instruction data corresponding to the action of rotating to the left side, and the sensing data and the map data on the time point when the action of rotating to the left side is performed in the memory 130.

Afterwards, when the test mode is executed, the robot cleaner 700 may replay the action based on the instruction data stored in the memory 130 and the sensing data corresponding to the instruction data.

The robot cleaner 700, according to an embodiment of the disclosure, may receive sensing data corresponding to the instruction data stored in the memory 130 from the server, and replay an action corresponding to the instruction data based on the instruction data stored in the memory 130 and the sensing data received from the server.

The robot cleaner 700, according to an embodiment of the disclosure, may receive instruction data and sensing data corresponding to the instruction data from the server, and replay an action based on the instruction data and the sensing data received from the server.

For example, another robot device 100 may perform communication with the server, and receive instruction data and sensing data corresponding to the instruction data from the server. In such an example, the another robot device 100 may replay an action based on the instruction data and the sensing data received from the server. The action replayed by the another robot device 100 may refer to the action performed by the robot cleaner 700. The another robot device 100 may replay the action performed in the robot cleaner 700 in the past, and/or simulate an action that may be performed. Here, the another robot device 100 may referred to as a simulator.

FIG. 2 is a detailed block diagram of a robot device 100 according to an embodiment of the disclosure.

Referring to FIG. 2, the robot device 100 according to an embodiment of the disclosure may include a sensor 110, a communication interface 120, a memory 130, a processor 140, and an operation part 150. Regarding components that overlap with the components illustrated in FIG. 1, explanation will be omitted.

The robot device 100 according to an embodiment may include an operation part 150 including an actuator or a motor. In some embodiments, the operation part 150 may include a wheel, a brake, etc. The robot device 100 may be implemented as a moving robot that may move in a specific place (e.g., a building, a home, a business such as, but not limited to, a restaurant, a hotel, a store, a hospital, a warehouse) by itself using the operation part 150.

The operation part 150 may include all components that are provided in the robot device 100 and make the robot device 100 capable of performing various operations and functions, other than components that make the robot device 100 movable. For example, the operation part 150 may include a robot joint and allow the robot device 100 to carry an external object.

Figure 8:
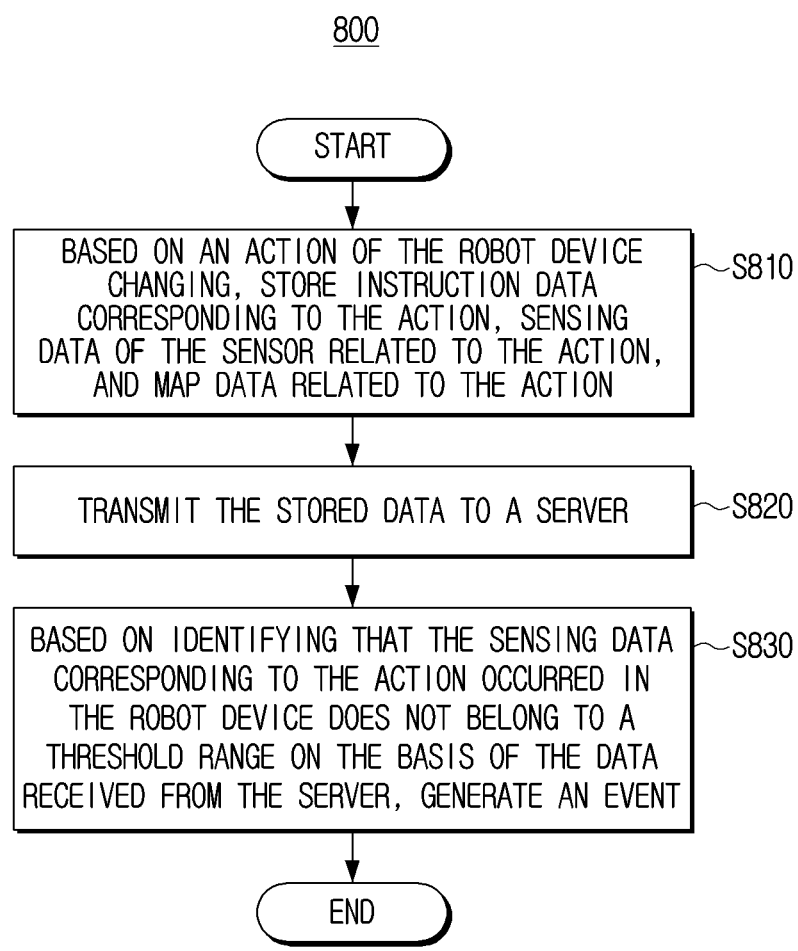
FIG. 8 is a flow chart for illustrating a control method for a robot device according to an embodiment of the disclosure.

FIG. 8 is a flow chart for illustrating a control method 800 for a robot device 100 according to an embodiment of the disclosure.

In the control method 800 for a robot device 100, if an action of the robot device 100 changes, instruction data corresponding to the action, sensing data related to the action, and map data related to the action are stored in operation S810.

Then, the stored data is transmitted to a server in operation S820.

In operation S830, if it is identified that the sensing data corresponding to the action occurred in the robot device 100 does not belong to (e.g., is not within, is outside of) a threshold range based on the data received from the server, an event is generated.

The instruction data according to an embodiment of the disclosure may be data in a robot programming language format for controlling at least one of a driving distance, a driving direction, and a driving speed of the robot device 100.

In some embodiments, the control method 800 may further include controlling hardware elements of the robot device 100 based on the data in the robot programming language format and generating the action.

The sensing data may include operation data generated in the hardware elements as the action occurs, and the map data may include information on an object in a specific place wherein the robot device 100 is located, and the information on the object may include at least one of location information, size information, shape information, and characteristic information of the object.

Also, the data received from the server may include data for a threshold range of sensing data for each action that may occur in the robot device 100, which was acquired by analyzing the data transmitted from the robot device 100 to the server, and the operation S830 of generating an event may include identifying whether the sensing data corresponding to the action occurred in the robot device 100 belongs to (e.g., is within) the threshold range based on the data for the threshold range.

In some embodiments, the data received from the server may indicate that the sensing data corresponding to the action occurred in the robot device 100 does not belong to (e.g., is not within, is outside of) the threshold range, and the operation S830 of generating an event may include generating the event based on the received data.

Further, the event may include at least one of a feedback notifying that the sensing data corresponding to the action occurred in the robot device 100 does not belong to (e.g., is not within, is outside of) the threshold range, an instruction controlling the hardware elements of the robot device 100 such that the sensing data corresponding to the action belongs to (e.g., is within) the threshold range, and an event notifying an element wherein an error occurred among the hardware elements of the robot device 100 based on the sensing data corresponding to the action.

In some embodiments, the control method 800 may further include the step of, based on a test mode being executed, replaying the action based on the stored instruction data and the stored sensing data corresponding to the instruction data, or replaying the action based on the instruction data stored in the memory and the sensing data received from the server corresponding to the instruction data.

In some embodiments, the operation S810 of storing the instruction data may include the steps of converting the instruction data and the sensing data into data of a robot programming language format and storing the converted data in the memory 130.

Figure 9:
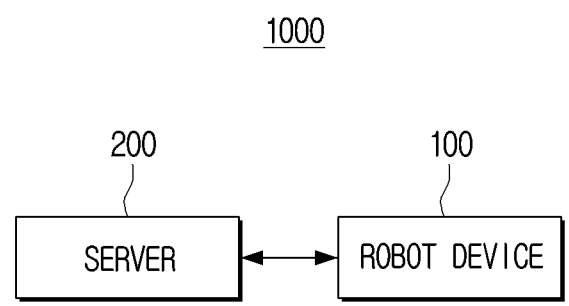
FIG. 9 is a block diagram illustrating a configuration of a robot device system according to an embodiment of the disclosure.

FIG. 9 is a block diagram illustrating a configuration of a robot device system according to an embodiment of the disclosure.

As shown in FIG. 9, a robot device system 1000 includes a robot device 100 and a server 200.

If an action changes, the robot device 100, according to an embodiment, may store instruction data corresponding to the action, sensing data of the sensor related to the action, and map data related to the action, and transmit the stored data to a server. Also, if it is identified that the sensing data corresponding to the action occurred in the robot device 100 does not belong to (e.g., is not within, is outside of) a threshold range based on the data received from the server 200, the robot device 100 may generate an event.

The server 200, according to an embodiment of the disclosure, may identify the threshold range of the sensing data corresponding to the action based on the instruction data, the sensing data, and the map data received from the robot device 100. Then, the server 200 may transmit data related to the identified threshold range to the robot device 100.

Figure 10:
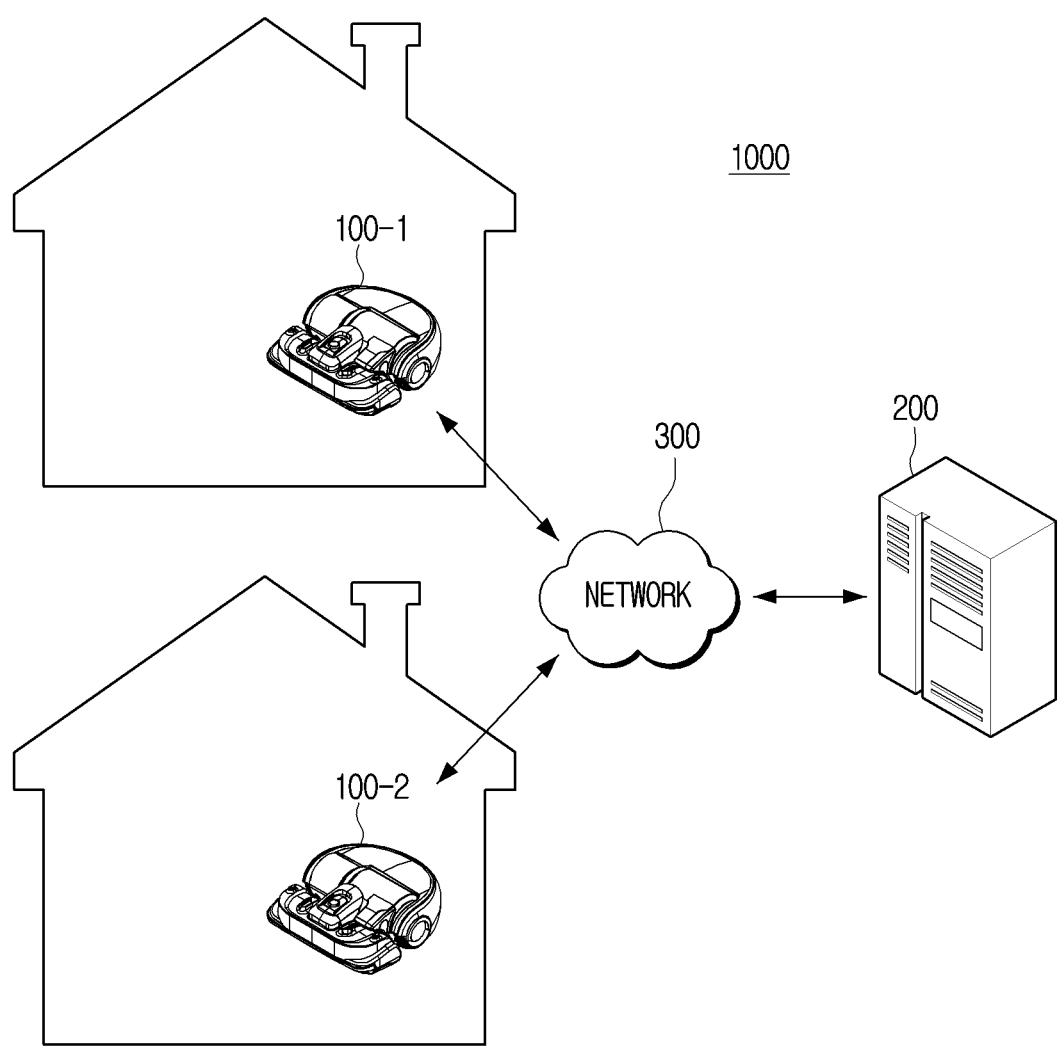
FIG. 10 is a diagram for illustrating a robot device system according to an embodiment of the disclosure.

A more detailed description in this regard is made with reference to FIG. 10.

FIG. 10 is a diagram for illustrating a robot device system 1000 according to an embodiment of the disclosure.

As shown in FIG. 10, the robot device system 1000 may include a plurality of robot devices (e.g., first robot device 100-1, and second robot device 100-2) communicatively coupled to a server 200 via a network 300.

Referring to FIG. 10, each of the plurality of robot devices (e.g., 100-1, 100-2), according to an embodiment of the disclosure, may transmit data to the server 200. As an example, if a first action changes, the first robot device 100-1 may transmit instruction data corresponding to the first action, sensing data related to the first action, and map data related to the first action to the server 200. Also, if a second action changes, the second robot device 100-2 may transmit instruction data corresponding to the second action, sensing data related to the second action, and map data related to the second action to the server 200. As data is received from the plurality of robot devices (e.g., 100-1, 100-2), the server 200 may acquire the instruction data, the sensing data, and the map data corresponding to each of the plurality of actions (e.g., the first action, the second action).

As an example, the server 200 may receive, from the first robot device 100-1, instruction data corresponding to the first action, and sensing data and map data generated as the first robot device 100-1 performs the first action. Also, the server 200 may receive, from the second robot device 100-2, instruction data corresponding to the second action, and sensing data and map data generated as the second robot device 100-2 performs the second action. Then, the server 200 may acquire standard sensing data for the first action based on the plurality of sensing data corresponding to the first action.

For example, the server 200 may analyze the sensing data received from the first robot device 100-1 and the sensing data received from the second robot device 100-2, and acquire sensing data by assuming a case wherein the first action is performed in a normal state of the hardware elements provided in a robot device 100. Here, the sensing data acquired by the server 200 may include standard sensing data corresponding to the first action.

In some embodiments, the server 200 may acquire standard sensing data for each action that may be performed in a robot device 100, and/or a threshold range of the sensing data. For example, the server 200 may acquire sensing data corresponding to the first action and the threshold range of the sensing data, and sensing data corresponding to the second action and the threshold range of the sensing data. The threshold range may refer to a range of determining whether a robot device 100 performed a specific action without an error (and/or without an error of the hardware elements) based on the sensing data received from a robot device 100.

As an example, the server 200, according to an embodiment of the disclosure, may transmit data for the threshold range of the sensing data corresponding to each of a plurality of actions that may occur in a robot device 100 to the first robot device 100-1. Then, the first robot device 100-1 may compare sensing data corresponding to a specific action performed in the first robot device 100-1 and standard sensing data corresponding to the specific action based on the data received from the server 200, and determine whether the similarity belongs within a threshold range. Then, if it is identified that the similarity is outside the threshold range according to the determination result, the first robot device 100-1 may provide feedback indicating that the hardware elements of the first robot device 100-1 are in a disabled state, or feedback notifying a hardware element related to the specific action as an event.

In some embodiments, a case wherein the similarity belongs within the threshold range may indicate that the specific action performed in the first robot device 100-1 was performed within a normal range. For example, the first robot device 100-1 may perform comparison between the sensing data generated as the first robot device 100-1 performed an action and the standard sensing data corresponding to the action, and determine whether the first robot device 100-1 performed the action within the normal range according to the comparison result. The normal range may refer to standard sensing data generated by assuming a case wherein the first robot device 100-1 performed the action in a state wherein the hardware elements are not in a disabled state, or standard sensing data including information on an error range that was predetermined for the action.

As another example, the server 200 may determine whether sensing data received from the first robot device 100-1 is outside a threshold range, and transmit the determination result to the first robot device 100-1. For example, the determination result may be data indicating that sensing data corresponding to an action occurred in the first robot device 100-1 does not belong to (e.g., is not within, is outside of) a threshold range, and when the data is received, the robot device 100 may provide a feedback indicating that the hardware elements are in a disabled state, or a feedback notifying a hardware element related to the specific action as an event.

Figure 11:
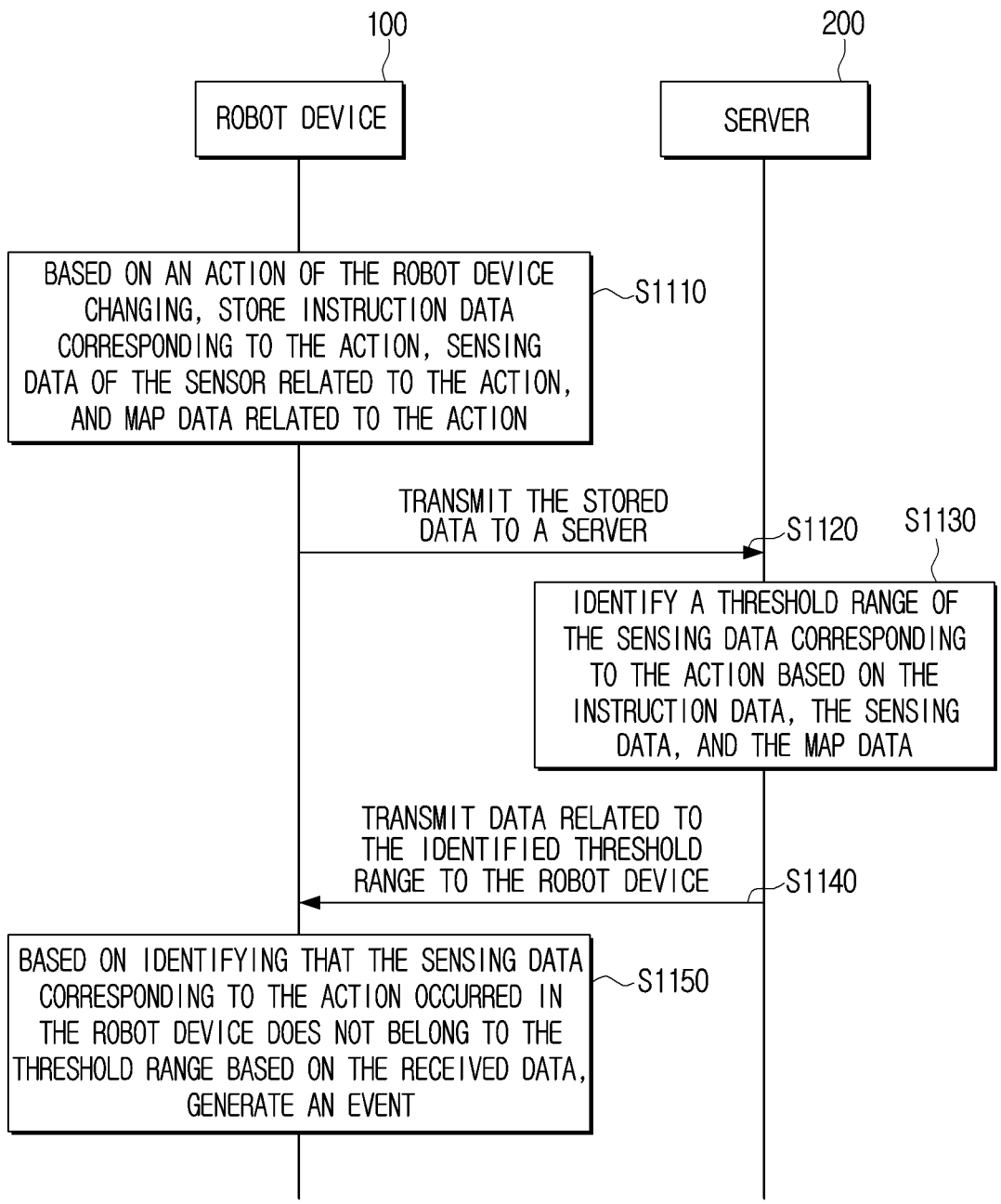
FIG. 11 is a sequence diagram for illustrating receipt and transmission of data between a server and a robot device according to an embodiment of the disclosure.

FIG. 11 is a sequence diagram for illustrating receipt and transmission of data between a server and a robot device 100 according to an embodiment of the disclosure.

Referring to FIG. 11, if an action of the robot device 100 changes, the robot device 100 may store, in operation S1110, instruction data corresponding to the action, sensing data of the sensor related to the action, and map data related to the action.

Then, the robot device 100 may transmit the stored data to a server in operation S1120.

In operation S1130, the server 200, according to an embodiment, may identify a threshold range corresponding to the action based on the instruction data, the sensing data, and the map data received from the robot device 100.

Then, the server 200 may transmit data related to the identified threshold range to the robot device 100 in operation S1140.

In operation S1150, if it is identified that the sensing data corresponding to the action occurred in the robot device 100 does not belong to (e.g., is not within, is outside of) the threshold range based on the received data, the robot device 100 may generate an event.

The various embodiments of the disclosure may be applied to all electronic devices, other than a robot device 100.

The various embodiments described above may be implemented by a recording medium that may be read by a computer or a device similar to a computer, by using software, hardware, or a combination thereof. In some cases, the embodiments described in this specification may be implemented as a processor itself. According to implementation by software, the embodiments such as procedures and functions described in this specification may be implemented as separate software modules. Each of the software modules may perform one or more functions and operations described in this specification.

Computer instructions for performing processing operations of a robot cleaner according to the various embodiments of the disclosure described above may be stored in a non-transitory computer-readable medium. Such computer instructions stored in a non-transitory computer-readable medium make the processing operations at the robot device 100 according to the various embodiments described above performed by a specific machine, when they are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a compact disc (CD), a digital video disc (DVD), a hard disc, a blue-ray disc, a USB, a memory card, a ROM and the like.

While embodiments of the disclosure have been shown and described, the disclosure is not limited to the aforementioned specific embodiments, and it is apparent that various modifications may be made by those having ordinary skill in the art to which the disclosure belongs, without departing from the gist of the disclosure as claimed by the appended claims. Further, it is intended that such modifications are not to be interpreted independently from the technical idea or prospect of the disclosure.

What is claimed is:
1. A robot device comprising:
   a sensor configured to generate sensing data related to an action of the robot device;
   a communication interface configured to communicate with a server;
   a memory storing instructions; and
   a processor configured to execute the instructions to:
      based on the action of the robot device changing, store action data in the memory, the action data comprising instruction data corresponding to the action, the sensing data related to the action, and map data related to the action,
      transmit, to the server via the communication interface, the action data stored in the memory,
      receive, from the server via the communication interface, standard data and threshold data corresponding to the action,
      identify a similarity between the standard data and the sensing data, and
      based on a determination that the similarity is outside of a threshold range indicated by the threshold data, generate an event,
      wherein the generation of the event comprises to provide, at the robot device, at least one of a visual feedback or an auditory feedback.
2. The robot device of claim 1, wherein the instruction data is in a robot programming language format, and is configured to control at least one of a driving distance, a driving direction, or a driving speed of the robot device, and the processor is further configured to execute the instructions to control the robot device, according to the instruction data, to generate the action.

3. The robot device of claim 1, wherein the sensing data related to the action comprises operation data generated in hardware elements of the robot device during performance of the action by the robot device,
the map data comprises information on an object located in a specific place that the robot device is located, and
the information on the object comprises at least one of location information of the object, size information of the object, shape information of the object, or characteristic information of the object.

4. The robot device of claim 1, wherein the threshold data comprises threshold range values of sensing data for each action of the robot device, the threshold range values having been acquired according to an analysis of the action data transmitted to the server, and
the processor is further configured to execute the instructions to identify whether the sensing data related to the action is within the threshold range.

5. The robot device of claim 1, wherein the threshold data indicates that the sensing data related to the action is outside of the threshold range, and
the processor is further configured to execute the instructions to generate the event based on the threshold data.

6. The robot device of claim 1, wherein the event comprises at least one of:
a first feedback notifying that the sensing data related to the action is outside of the threshold range,
an instruction configured to control hardware elements of the robot device such that the sensing data related to the action is within the threshold range, and
a second feedback identifying a hardware element from among the hardware elements of the robot device wherein an error occurred, based on the sensing data related to the action.

7. The robot device of claim 1, wherein the processor is further configured to execute the instructions to:
based on a test mode being executed, replay the action based on the instruction data stored in the memory and the sensing data stored in the memory corresponding to the instruction data, or replay the action based on the instruction data stored in the memory and other sensing data received from the server corresponding to the instruction data.

8. The robot device of claim 1, wherein the processor is further configured to execute the instructions to:
convert the instruction data and the sensing data into converted data in a robot programming language format,
store the converted data in the memory, and
transmit the converted data to the server via the communication interface.

9. A robot device system comprising:
a robot device configured to, based on an action of the robot device changing, store action data comprising instruction data corresponding to the action, sensing data related to the action and generated by a sensor of the robot device, and map data related to the action; and
a server configured to identify a threshold range of the sensing data related to the action based on the action data received from the robot device, and transmit, to the robot device, standard data and threshold data related to the identified threshold range,
wherein the robot device is further configured to:
identify a similarity between the standard data and the sensing data, and
based on a determination that the similarity is outside of the threshold range indicated by the threshold data, generate an event,
wherein the generation of the event comprises to provide, at the robot device, at least one of a visual feedback or an auditory feedback.

10. The robot device system of claim 9, wherein the server is further configured to:
receive, from the robot device, instruction data and sensing data corresponding to each of a plurality of actions, and
identify a threshold range of each of the plurality of actions, based on the received instruction data and sensing data.

11. The robot device system of claim 9, wherein the threshold data comprises information regarding the threshold range of the sensing data corresponding to each of a plurality of actions of the robot device.

12. The robot device system of claim 9, wherein the threshold data comprises information indicating that the sensing data related to the action is outside of the threshold range.

13. A control method for a robot device, the control method comprising:
storing, in a memory of the robot device, action data corresponding to an action of the robot device, based on the action of the robot device changing, the action data comprising instruction data corresponding to the action, sensing data related to the action, and map data related to the action;
transmitting the stored data to a server;
receiving, from the server, standard data and threshold data corresponding to the action data;
identifying a similarity between the standard data and the sensing data; and
based on determining that the similarity is outside of a threshold range indicated by the threshold data, generating an event,
wherein the generating of the event comprises providing, at the robot device, at least one of a visual feedback or an auditory feedback.

14. The control method of claim 13, wherein the instruction data is in a robot programming language format, and is configured to control at least one of a driving distance, a driving direction, or a driving speed of the robot device, and
the control method further comprises controlling the robot device to generate the action based on the instruction data.

15. The control method of claim 13, wherein the sensing data comprises operation data generated in hardware elements of the robot device during performing of the action by the robot device,
the map data comprises information on an object located in a specific place that the robot device is located, and
the information on the object comprises at least one of location information of the object, size information of the object, shape information of the object, or characteristic information of the object.

16. The control method of claim 13, wherein the threshold data received from the server comprises threshold range values of sensing data for each action of the robot device, the threshold range values having been acquired according to an analysis of the action data transmitted to the server, and the generating of the event comprises identifying whether the sensing data related to the action is within the threshold range.

17. The control method of claim 13, wherein the threshold data indicates that the sensing data related to the action is outside of the threshold range, and
the generating of the event comprises generating the event based on the threshold data.

18. The control method of claim 13, wherein the event comprises at least one of:
a first feedback notifying that the sensing data related to the action is outside of the threshold range,
an instruction configured to control hardware elements of the robot device such that the sensing data related to the action is within the threshold range, and
a second feedback identifying a hardware element from among the hardware elements of the robot device wherein an error occurred, based on the sensing data related to the action.

19. The control method of claim 13, further comprising:
based on a test mode being executed, replaying the action based on the instruction data stored in the memory and the sensing data stored in the memory corresponding to the instruction data, or replaying the action based on the instruction data stored in the memory and other sensing data received from the server corresponding to the instruction data.

20. The control method of claim 13, wherein the storing of the action data in the memory comprises:
converting the instruction data and the sensing data into converted data in a robot programming language format;
storing the converted data in the memory; and
transmitting the converted data to the server.

* * * * *